(12) United States Patent
Woolf (10) Patent No.: US 10,810,159 B2
(45) Date of Patent: Oct. 20, 2020

(54) MODULAR UPDATING OF VISUALIZATIONS

(71) Applicant: Microsoft Technology Licensing, LLC., Redmond, WA (US)

(72) Inventor: Michael Woolf, Seattle, WA (US)

( * ) Notice: Subject to any disclaimer, the term of this patent is extended or adjusted under 35 U.S.C. 154(b) by 224 days.

(21) Appl. No.: 14/683,085

(22) Filed: Apr. 9, 2015

(65) Prior Publication Data

US 2016/0103828 A1 Apr. 14, 2016

Related U.S. Application Data

(60) Provisional application No. 62/063,741, filed on Oct. 14, 2014.

(51) Int. Cl.
*G06F 17/30* (2006.01)
*G06F 16/16* (2019.01)
(Continued)

(52) U.S. Cl.
CPC ............. *G06F 16/164* (2019.01); *G06K 9/52* (2013.01); *G06T 1/20* (2013.01); *G06T 11/003* (2013.01);
(Continued)

(58) Field of Classification Search
CPC .... G06T 11/206; G06F 3/0481; G06F 17/246; H04L 12/2458; G06Q 10/10
See application file for complete search history.

(56) References Cited

U.S. PATENT DOCUMENTS 5,870,101 A * 2/1999 Murata .................. G06T 15/04
345/584
6,213,944 B1 4/2001 Miller
(Continued)

FOREIGN PATENT DOCUMENTS

CN 101911126 A 12/2010
CN 102473319 A 5/2012
(Continued)

OTHER PUBLICATIONS

U.S. Appl. No. 14/683,091, Office Action dated Jan. 5, 2017, 87 pages.
(Continued)

*Primary Examiner* — Todd Buttram
(74) *Attorney, Agent, or Firm* — NovoTechIP International PLLC (57) ABSTRACT

The modular updating of visualizations is provided. Elements of a visualization (e.g., graphical representations of data series, axes, titles, etc.) are only updated within the visualization when the hierarchical data defining that element is changed, thus reducing the processing load on the system providing the visualization. According to an aspect, the changes in the data are accurately translated from an arbitrary hierarchy format into a normalized hierarchy format so that a data visualization platform modularly update the hierarchical data that defines the visualization. According to an aspect, modular updating of hierarchy data enables updating a visualization in pieces (i.e., modularly), such that portions of the visualization that are not affected by the change to the data are not updated and do not need to be recalculated for rendering.

20 Claims, 7 Drawing Sheets

(51) Int. Cl.

| | | |
|---|---|---|
| *G06T 11/40* | (2006.01) | |
| *G06T 13/80* | (2011.01) | |
| *G06T 15/40* | (2011.01) | |
| *G06T 19/20* | (2011.01) | |
| *G06K 9/52* | (2006.01) | |
| *G06T 11/20* | (2006.01) | |
| *G06T 1/20* | (2006.01) | |
| *G06T 11/60* | (2006.01) | |
| *G06T 13/20* | (2011.01) | |
| *G06T 11/00* | (2006.01) | |
| *G06T 15/08* | (2011.01) | |
| *G06T 17/10* | (2006.01) | |

(52) U.S. Cl.
CPC ............ *G06T 11/206* (2013.01); *G06T 11/40* (2013.01); *G06T 11/60* (2013.01); *G06T 13/20* (2013.01); *G06T 13/80* (2013.01); *G06T 15/08* (2013.01); *G06T 15/40* (2013.01); *G06T 17/10* (2013.01); *G06T 19/20* (2013.01); *G06T 2200/04* (2013.01); *G06T 2200/28* (2013.01); *G06T 2210/36* (2013.01); *G06T 2210/44* (2013.01); *G06T 2219/004* (2013.01); *G06T 2219/2012* (2013.01); *G06T 2219/2024* (2013.01)

(56) References Cited

U.S. PATENT DOCUMENTS

| | | | |
|---|---|---|---|
| 6,359,629 | B1 | 3/2002 | Hopcroft et al. |
| 6,480,205 | B1 | 11/2002 | Greene et al. |
| 6,636,215 | B1 | 10/2003 | Greene |
| 6,995,768 | B2 | 2/2006 | Jou et al. |
| 7,023,440 | B1 | 4/2006 | Havekost et al. |
| 7,334,197 | B2 | 2/2008 | Robertson et al. |
| 8,090,776 | B2 | 1/2012 | Torres et al. |
| 8,527,458 | B2 | 9/2013 | Park et al. |
| 8,589,425 | B2 | 11/2013 | Gonzalez et al. |
| 8,638,343 | B2 | 1/2014 | Allyn et al. |
| 8,990,258 | B2 | 3/2015 | Bhatia |
| 9,250,926 | B2 | 2/2016 | Allyn et al. |
| 2004/0030758 | A1* | 2/2004 | Cherdron ............ G06F 17/3089 709/218 |
| 2004/0068491 | A1* | 4/2004 | Iline .................... G06F 21/6227 |
| 2004/0252136 | A1 | 12/2004 | Bhatt |
| 2005/0140694 | A1 | 6/2005 | Subramanian |
| 2007/0153004 | A1 | 7/2007 | Airey |
| 2007/0153006 | A1 | 7/2007 | Robbins et al. |
| 2007/0185904 | A1* | 8/2007 | Matsuzawa ........ G06F 17/30958 |
| 2008/0034292 | A1 | 2/2008 | Brunner |
| 2008/0192056 | A1 | 8/2008 | Robertson et al. |
| 2009/0125809 | A1* | 5/2009 | Trapani ................ G06F 17/227 715/273 |
| 2009/0140978 | A1 | 6/2009 | Louch |
| 2009/0217163 | A1* | 8/2009 | Jaroker .................... G06F 8/60 715/700 |
| 2009/0327921 | A1 | 12/2009 | Holm-Peterson et al. |
| 2010/0162152 | A1 | 6/2010 | Allyn |
| 2010/0214299 | A1 | 8/2010 | Robertson |
| 2010/0277507 | A1 | 11/2010 | Allyn et al. |
| 2010/0312803 | A1 | 12/2010 | Gong et al. |
| 2011/0285727 | A1 | 11/2011 | Fernandez |
| 2012/0023077 | A1 | 1/2012 | Kann et al. |
| 2012/0124159 | A1* | 5/2012 | Takahashi .......... H04N 7/17318 709/213 |
| 2012/0159465 | A1 | 6/2012 | Mital et al. |
| 2012/0218254 | A1 | 8/2012 | Abeln |
| 2012/0229445 | A1 | 9/2012 | Jenkins |
| 2012/0313957 | A1 | 12/2012 | Fisher et al. |
| 2013/0120358 | A1 | 5/2013 | Fan et al. |
| 2013/0179791 | A1 | 7/2013 | Polski et al. |
| 2013/0204841 | A1 | 8/2013 | Obusek |
| 2013/0215043 | A1* | 8/2013 | Olomskiy ............ G06F 3/0481 345/173 |
| 2013/0271472 | A1 | 10/2013 | Duran |
| 2013/0346899 | A1 | 12/2013 | Cole et al. |
| 2014/0043325 | A1 | 2/2014 | Ruble |
| 2014/0108449 | A1 | 4/2014 | Peloski |
| 2014/0125672 | A1 | 5/2014 | Winternitz et al. |
| 2014/0149669 | A1* | 5/2014 | Kim .................... G06F 12/0893 711/119 |
| 2014/0298170 | A1 | 10/2014 | Mercille |
| 2014/0337703 | A1 | 11/2014 | Gong et al. |
| 2015/0346972 | A1 | 12/2015 | Boekling et al. |
| 2016/0004544 | A1* | 1/2016 | Paraschivescu ...... G06F 9/4443 715/744 |
| 2016/0103872 | A1 | 4/2016 | Prophete et al. |
| 2016/0104306 | A1 | 4/2016 | Allyn |
| 2016/0104307 | A1 | 4/2016 | Allyn |
| 2016/0104308 | A1 | 4/2016 | Allyn |
| 2016/0104311 | A1 | 4/2016 | Allyn |
| 2016/0104318 | A1 | 4/2016 | Allyn |

FOREIGN PATENT DOCUMENTS

| | | |
|---|---|---|
| CN | 102708126 A | 10/2012 |
| CN | 102999932 A | 3/2013 |
| EP | 2592598 A2 | 5/2013 |

OTHER PUBLICATIONS

U.S. Appl. No. 14/683,079, Office Action dated Dec. 29, 2016, 69 pages.
U.S. Appl. No. 14/683,056, Amendment and Response filed Jan. 12, 2017, 11 pages.
U.S. Appl. No. 14/683,056, Office Action dated Jan. 23, 2017, 38 pages.
U.S. Appl. No. 14/683,100, Amendment and Response filed Jan. 19, 2017, 15 pages.
U.S. Appl. No. 14/683,100 Office Action dated Mar. 6, 2017, 42 pages.
U.S. Appl. No. 14/683,110, Amendment and Response filed Feb. 15, 2017, 10 pages.
U.S. Appl. No. 14/683,056, Office Action dated Oct. 12, 2016, 26 pages.
PCT 2nd Written Opinion in International Application PCT/US2015/055416, dated Aug. 19, 2016, 7 pages.
U.S. Appl. No. 14/683,110, Amendment and Response filed Oct. 13, 2016, 10 pages.
U.S. Appl. No. 14/683,091, Amendment and Response filed Dec. 6, 2016, 11 pages.
U.S. Appl. No. 14/683,110, Office Action dated Nov. 16, 2016, 30 pages.
U.S. Appl. No. 14/683,079, Amendment and Response filed Dec. 13, 2016, 10 pages.
U.S. Appl. No. 14/683,056, filed Apr. 9, 2015 entitled "Data Visualization Architecture".
U.S. Appl. No. 14/683,091, filed Apr. 9, 2015 entitled "Performance Optimization for Data Visualization".
U.S. Appl. No. 14/683,100, filed Apr. 9, 2015 entitled "Animation Framework".
U.S. Appl. No. 14/683,110, filed Apr. 9, 2015 entitled "Annotated Geometry".
U.S. Appl. No. 14/683,079, filed Apr. 9, 2015 entitled "Data Visualization Extensibility Architecture".
Stolte, et al., "Polaris: A System for Query, Analysis, and Visualization of Multidimensional Relational Databases", In Proceedings of IEEE Transactions on Visualization and Computer Graphics, vol. 8, No. 1, Jan. 2002, 14 pages.
Petricek, et al., "Tutorial: Creating Charts with Real-Time Data", Published on: Jan. 2010 Available at: http://msdn.microsoft.com/en-us/library/vstudio/hh297119%28v=vs.100%29.aspx.
U.S. Appl. No. 14/683,100, Office Action dated Jul. 20, 2016, 27 pages.
U.S. Appl. No. 14/683,110, Office Action dated Jul. 12, 2016, 24 pages.
U.S. Appl. No. 14/683,056, Amendment and Response filed Sep. 19, 2016, 12 pages.

(56) References Cited

OTHER PUBLICATIONS

U.S. Appl. No. 14/683,091, Amendment and Response filed Aug. 22, 2016, 11 pgs.
U.S. Appl. No. 14/683,091, Office action dated Sep. 8, 2016, 43 pages.
PCT 2nd Written Opinion in International Application PCT/US2015/055415, dated Aug. 19, 2016, 7 pgs.
U.S. Appl. No. 14/683,079, Amendment and Response filed Aug. 22, 2016, 11 pages.
U.S. Appl. No. 14/683,056, Office action dated May 17, 2016, 42 pages.
U.S. Appl. No. 14/683,091, Office action dated Apr. 20, 2016, 50 pages.
U.S. Appl. No. 14/683,079, Office action dated Apr. 20, 2016, 47 pages.
Fabian Nunez. "An extended spreadsheet paradigm for data visualization systems, and its implementation", Master's thesis, University of Cape Town, Nov. 2000. At http://citeseer.ist.psu.edu/543469.html.
Kumar, Ajit, "Sencha Ext JS 5 Charts Architecture", Retrieved from <<http://webcache.googleusercontent.com/search?q=cache:_qqLqRn-KJEJ:blogs.walkingtree.in/2014/08/30/sencha-ext-js-5-charts-architecture/+&cd=1&hl=en&ct=clnk&gl=nl>, Aug. 30, 2014, 7 Pages.
"International Search Report & Written Opinion Issued in PCT Application No. PCT/US2015/054110", dated Jan. 27, 2016, 13 Pages.
"International Search Report Issued in PCT Application No. PCT/US2015/055416", dated Feb. 4, 2016, 12 Pages.
"International Search Report and Written Opinion Issued in PCT Application No. PCT/US2015/055417", dated Feb. 19, 2016, 11 Pages.
Nunez, et al., "Vissh: A Data Visualisation Spreadsheet", In Proceedings of the Joint Eurographics and IEEE TCVG Symposium on Visualization, Data Visualization, Retrieved on: May 29, 2000, 10 Pages.
Kumar, Ajit, "Sencha Ext JS 5 Charts Architecture", Retrieved from <<http://webcache.googleusercontent.com/search?q=cache:_qqLqRn-KJEJ:blogs.walkingtree.in/2014/08/30/sencha-ext-js-5-charts-architecture/+&cd=1&hl=en&ct=clnk&gl=nl>>, Aug. 30, 2014, 4 Pages.
Arora, Ankush, "Google ChartsTool for Visualization Week 7 Report", Retrieved from <<http://docplayer.net/8390711-Google-charts-tool-for-visualization-week-7-reportankush-arora.html>>, Jun. 28, 2014, 25 Pages.
International Search Report and Written Opinion Issued in PCT Application No. PCT/US2015/055415, dated Feb. 15, 2016, 13 Pages.
Eskroch, "Point Culling #6", Retrieved at<<https://github.com/core-plot/core-plot/issues/6>>, Dec. 29, 2013, pp. 1-2.
Shen, et al., "On Point Feature Automatic Annotation Placement in 3D Environment", Retrieved at <<http://www.isprs.org/proceedings/XXXVII/congress/2_pdf/9_ThS-4/05.pdf>>, Jan. 1, 2008, 4 Pages.
U.S. Appl. No. 14/683,056, Office Action dated Jul. 12, 2017, 50 pages.
U.S. Appl. No. 14/683,091, Office Action dated Aug. 7, 2017, 93 pages.
U.S. Appl. No. 14/683,100, Amendment and Response filed Aug. 1, 2017, 14 pages.
U.S. Appl. No. 14/683,110, Office Action dated May 30, 2017, 30 pages.
U.S. Appl. No. 14/683,079, Amendment and Response filed Apr. 28, 2017, 10 pages.
U.S. Appl. No. 14/683,079, Office Action dated May 17, 2017, 71 pages.
U.S. Appl. No. 14/683,056, Amendment and Response filed Jun. 23, 2017, 9 pages.
U.S. Appl. No. 14/683,091, Amendment and Response filed Jul. 5, 2017, 15 pgs.
European Office Action in Application 13728050.9, dated May 26, 2017, 3 pages.
U.S. Appl. No. 14/683,079, Office action dated Sep. 13, 2016, 71 pages.
PCT 2nd Written Opinion in International Application PCT/US2015/055417, dated Sep. 15, 2016, 9 pgs.
U.S. Appl. No. 14/683,100, Office Action dated Nov. 27, 2017, 48 pages.
U.S. Appl. No. 14/683,110, Amendment and Response filed Oct. 30, 2017, 12 pages.
U.S. Appl. No. 14/683,110, Office Action dated Dec. 13, 2017, 31 pages.
U.S. Appl. No. 14/683,056, Amendment and Response filed Jan. 12, 2018, 11 pages.
"Final Office Action issued in U.S. Appl. No. 14/683,100", dated May 24, 2018, 51 Pages.
"Non Final Office Action issued in U.S. Appl. No. 14/683,110", dated May 30, 2018, 35 Pages.
"International Preliminary Report on Patentability Issued in PCT Application No. PCT/US2015/055415", dated Jan. 27, 2017, 8 Pages.
"International Preliminary Report on Patentability Issued in PCT Application No. PCT/US2015/055416", dated Jan. 27, 2017, 8 Pages.
"International Preliminary Report on Patentability Issued in PCT Application No. PCT/US2015/055417", dated Jan. 25, 2017, 10 Pages.
"How to (not) Chart Blank Cells in an Excel Graph", Retrieved from: https://danjharrington.wordpress.com/2011/10/03/how-to-not-chart-blank-cells-in-an-excel-graph/, Oct. 3, 2011, 2 Pages.
"Final Office Action Issued in U.S. Appl. No. 14/683,100", dated Feb. 4, 2019, 48 Pages.
"First Office Acton and Search Report Issued in Chinese Patent Application No. 201580055954.5", dated Sep. 11, 2019, 19 Pages.
Pandre, Andrei, "Good Practices for Data Visualization,", Retrieved from: https://apandre.wordpress.com/2013/05/24/data-visualization-good-practices/, 6 Pages.
Rose, Gordon, "Tableau Data Extracts—Tips, Tricks and Best Practices", Retrieved from: https://www.tableau.com/tableau-data-extracts-part3, Aug. 15, 2014, 13 Pages.
Yu, et al., "Interactive Storyboard: Animated Story Creation on Touch Interfaces", In Proceedings of the 5th International Conference on Active Media Technology, Oct. 22, 2009, pp. 93-103.
Zhang, et al., "WPF and Silverlight Tutorial", In Nankai University Press, Jul. 31, 2012, pp. 92-107.
"Extended European Search Report Issued in European Patent Application No. 19209509.9", dated Mar. 3, 2020, 9 Pages.
"First Office Acton and Search Report Issued in Chinese Patent Application No. 201580055999.2", dated Nov. 29, 2019, 12 Pages.
"Office Action Issued in European Patent Application No. 15785012.4", dated Oct. 26, 2018, 7 Pages.
"Non Final Office Action Issued in U.S. Appl. No. 14/683,056", dated Sep. 21, 2018, 34 Pages.
"Non Final Office Action Issued in U.S. Appl. No. 14/683,100", dated Sep. 27, 2018, 45 Pages.
"Second Office Action Issued in Chinese Patent Application No. 201580055954.5", dated Jul. 9, 2020, 11 Pages.
"Office Action Issued in Chinese Patent Application No. 201580055999.2", dated Jul. 3, 2020, 8 Pages.

\* cited by examiner

MODULAR UPDATING OF VISUALIZATIONS

CROSS REFERENCE TO RELATED APPLICATIONS

This application claims the benefit of U.S. Provisional Patent Application No. 62/063,741, titled "Data Visualization" filed Oct. 14, 2014.

BACKGROUND

Hierarchy data is metadata that indicates the hierarchical relationships between the data points (also referred to as nodes) comprising hierarchical data. Systems may rely on hierarchy data to properly represent data graphically in a data visualization (e.g., a chart, an infographic, a map, a gauge, etc.). When hierarchy data is modified, hierarchical relationships may be changed or lost as a result and even small changes are treated by prior systems as affecting the entire hierarchy, which can force a system to devote extensive resources to rebuild the hierarchy on every change to the hierarchical data. Additionally, different systems may use different hierarchy data formats, or hierarchy data may be malformed, which can force a system to devote extensive resources to update hierarchical data whenever data or metadata are manipulated or prevent systems from communicating. It is with respect to these and other considerations that examples will be made.

SUMMARY

This summary is provided to introduce a selection of concepts in a simplified form that are further described below in the Detailed Description section. This summary is not intended to identify all features of the claimed subject matter, nor is it intended to limit determining the scope of the claimed subject matter.

In order to minimize the system resources needed to react to a change in hierarchy data, the modular updating of hierarchical data is provided. Modularly updating hierarchical data enables a system, such as a data visualization system, to update changed portions of hierarchical data without having to rebuild the entire hierarchy. By only updating the portions of the hierarchical data affected by the change, systems that rely on hierarchical data can maintain the unaffected portions and devote resources only to the portions affected by the change; thus reducing the system resources needed.

To enable the modular updating of hierarchical data, the system is operable to read the hierarchy data to determine hierarchical relationships and to isolate hierarchical data unrelated to the change from hierarchical data related to the change. When a change is received, the related hierarchy data is updated, whereas the unrelated portions of the hierarchy data remain unaffected. In some examples, a change may be cascaded through several levels of related hierarchy data. Aspects of the system are operable to determine which hierarchy data are related for the purposes of a change and how far to cascade the change.

Hierarchical relationships can be referred to via the family analogy, wherein a node may be a "parent" to a node lower in the hierarchy, or be a "child" to a node higher in the hierarchy when they share a link in dependencies. When two nodes share common parent nodes, they may be referred to as "sibling" or "sister" nodes. When two nodes share no dependencies, they may be referred to as "unrelated" nodes. Hierarchical relationships may also be referred to via the tree analogy, wherein a node with no parent nodes is referred to as a "root" node, and a node with no child nodes is referred to as a "leaf" node. A leaf node may be separated from a root node by several levels within a hierarchy relationship, which may be referred to as "branches." These hierarchical relationships are indicated or defined according to a hierarchy data format, and various systems may employ various hierarchy data formats.

Aspects provide for a hierarchy data transform to be applied to hierarchy data in unsupported formats to enable a system to apply modular updates to the hierarchy data, as not all hierarchy data formats are equally receptive to modular updates. A data transform is generally an operation to change data from a first format into a second format. Hierarchy data is metadata which indicates or defines the hierarchical relationships between data points (referred to as nodes) comprising associated data. It should therefore be understood that a hierarchy data transform is operable to change the format of hierarchy data, and thereby affect how the hierarchical relationships between data points are indicated or defined.

Aspects provide for the modular updating of a visualization described by hierarchical data, wherein portions of the visualization that are affected by a change to the hierarchical data can be re-generated to reflect the changed hierarchical data to replace previous versions of those portions in the visualization. The modular updating of portions of a visualization allows a system to reuse unaffected portions, and thus avoid the system costs associated with re-generating those unaffected portions.

Examples may be implemented as a computer process, a computing system, or as an article of manufacture such as a computer program product or computer readable media. The computer program product may be a computer storage medium readable by a computer system and encoding a computer program of instructions for executing a computer process. The details of one or more aspects are set forth in the accompanying drawings and description below. Other features and advantages will be apparent from a reading of the following detailed description and a review of the associated drawings. It is to be understood that the following detailed description is explanatory only and is not restrictive of other aspects of the present disclosure.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

The following detailed description refers to the accompanying drawings. Wherever possible, the same reference numbers are used in the drawings and the following description to refer to the same or similar elements. While aspects of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the disclosure is defined by the appended claims. Examples may take the form of a hardware implementation, or an entirely software implementation, or an implementation combining software and hardware aspects. The following detailed description is, therefore, not to be taken in a limiting sense.

Examples of the present disclosure are directed to providing interpretation of change notifications to modularly update portions of hierarchy data defined by a normalized hierarchy data format. According to an aspect, the modular updating of hierarchy data enables updating portions of a data visualization (e.g., a chart, infographic, map, gauge, etc.), without having to rebuild the entire data visualization. According to aspects, modular updates are communicated via a one-directional chain of separate stages, each stage having a simple input interface and output interface. Modular updates enable a system, such as a data visualization system, to update changed portions of hierarchy data without having to rebuild the entire hierarchy. By only updating the portions of the hierarchy data affected by a change, systems that rely on the hierarchy data can maintain the unaffected portions and devote resources only to the portions affected by the change; thus reducing the system resources needed.

Hierarchy data is metadata which indicates or defines the hierarchical relationships between data points (referred to as nodes) comprising associated data. Hierarchical relationships can be referred to via the family analogy, wherein a node may be a "parent" to a node lower in the hierarchy, or be a "child" to a node higher in the hierarchy when the two nodes share a link in dependencies. When two nodes share common parent nodes and are the same level in the hierarchy, they may be referred to as "sibling" or "sister" nodes. When two nodes share no dependencies, they may be referred to as "unrelated" nodes. Hierarchical relationships may also be referred to via the tree analogy, wherein a node with no parent nodes is referred to as a "root" node, and a node with no child nodes is referred to as a "leaf" node. A leaf node may be separated from a root node by several levels within a hierarchy relationship, which may be referred to as "branches." These hierarchical relationships are indicated or defined according to a hierarchy data format, and various systems may employ various hierarchy data formats.

In various aspects, data hierarchy formats include fields that explicitly indicate how a system should interpret the hierarchy position for a given data point. In an example explicit data hierarchy format, the data hierarchy may explicitly indicate an identity of a parent node for each node, and when a node is a root node, the parent identity field may be blank, self-referencing, or a special value (e.g., Void, Not-a-Number (NaN), etc.). In other aspects, systems infer data hierarchies from the overall structure of the data hierarchy. In an example inferential data hierarchy format, a change in a category field value between consecutively identified nodes (e.g., node 1 has category field value of 0 and node 2 has category field value of 1) indicates that the nodes are parent and child, whereas consistent category field values (e.g., node 2 has category field value of 1 and node 3 has a category field value of 1) indicates that the nodes may be siblings. Accordingly, when one of the potential siblings has an inferred parent, the other potential sibling will be inferred to have the same parent, but when neither potential sibling has an inferred parent, the nodes are inferred to be root nodes.

Aspects provide for a hierarchy data transform to be applied to hierarchy data in arbitrary formats to enable a system to apply modular updates to the hierarchy data. A data transform is generally an operation to change data from a first format into a second format. Hierarchy data may be organized according to one of several formats that are not initially known (i.e., an arbitrary format), which may include zero or more category dimensions and a value dimension. It should therefore be understood that the example hierarchy data transforms described herein are operable to change arbitrary formats of hierarchy data into a normalized hierarchy data format, which is operable to enable a system to modularly update a data hierarchy and portions of a data visualization.

Aspects provide a visualization described by hierarchical data to be updated modularly. According to an aspect, a change notification indicates to an appropriate portion of a data visualization platform the portions of the visualization that are affected by a change to the hierarchical data. Accordingly, the affected portions of the visualization are re-generated to reflect the changed hierarchical data to update only the affected portions in the visualization. This updating of affected portions of a visualization allows a system to reuse unaffected portions, which avoids the system costs associated re-generation of the unaffected portions of the visualization.

Figure 1:
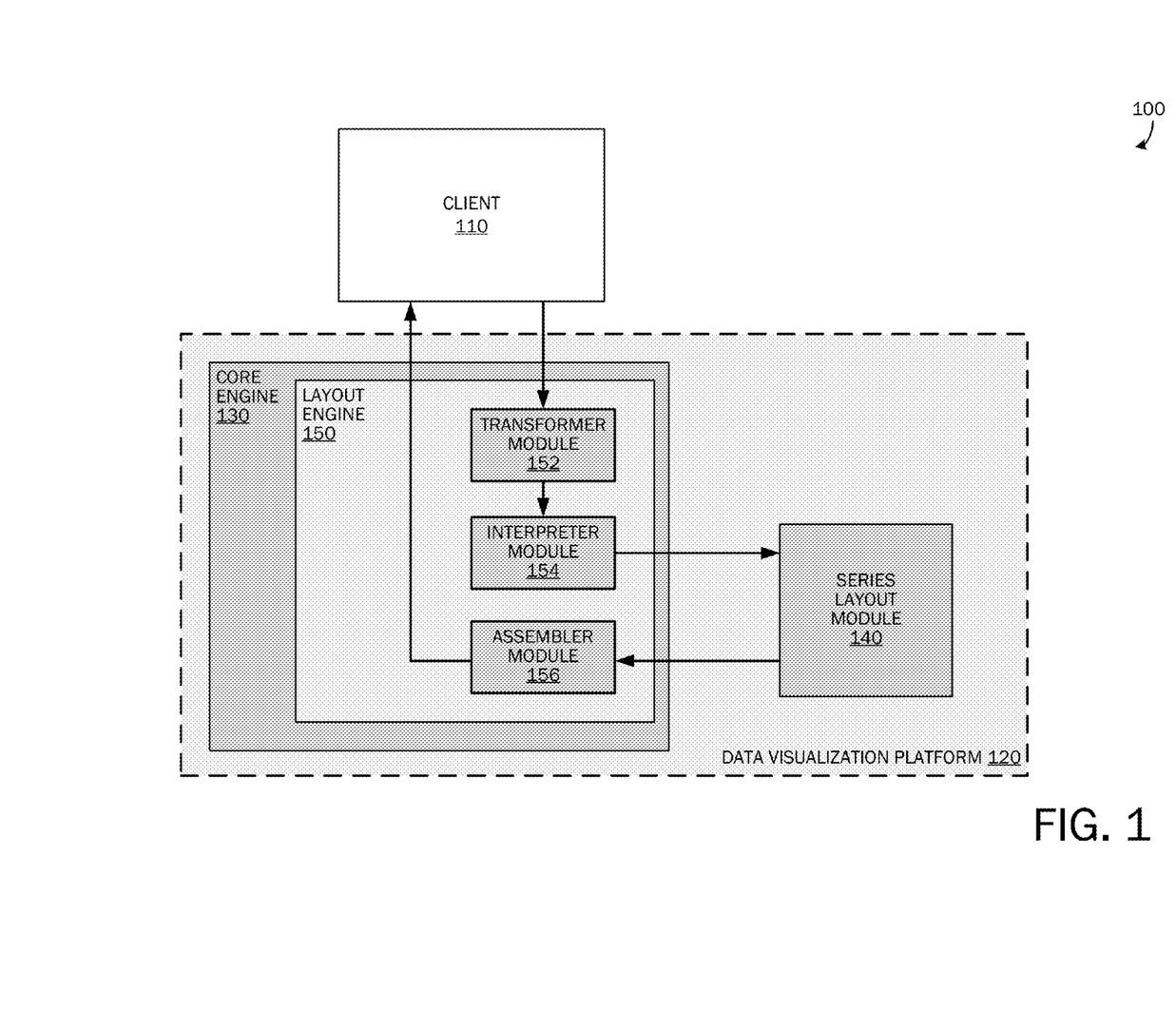
FIG. 1 is an example block diagram of a system including a data visualization platform operable to modularly update visualizations.

FIG. 1 is an example block diagram of a system 100 including a data visualization platform 120 operable to modularly update visualizations. The data visualization platform 120 comprises a core engine 130, including a layout engine 150, and a series layout module 140 to provide one or more of a plurality of series layouts. According to aspects, the client 110 may be one of various types of client applications that may run on various types of platforms or operating systems. That is, the data visualization platform 120 is not tied to a specific client application or to a specific platform, and is not biased toward a specific programming language, data source, or a specific set of features, and is compatible with all graphics stacks.

According to aspects, the data visualization platform 120 is operable to receive a set of data, transform the data into a normalized form ready for layout, take the normalized data and build a hierarchical scene graph of visual elements comprised of geometry or text, and provide a data context-aware set of geometry and text that the client 110 can render.

The client 110 links to the data visualization platform 120 and, according to aspects, implements callback interfaces which are used to fetch single data dimensions (e.g., x/y, x/y/r, etc.) and to calculate text sizes and provide client context (e.g., a surface description). In aspects, the client 110 builds a definition of a visualization and feeds the data defining the visualization to the data visualization platform 120 via an Application Programming Interface (API). For example, the client 110 defines the visualization through the API by adding and configuring shared objects (e.g., chart, series, axes, legend, and other objects used in common by data series within a visualization) within its set, which the API passes to the layout engine 150. According to aspects, the client 110 may optionally implement one or more data transforms to transform data into a format that the layout engine 150 can use. For example, if the data is in the form of raw user data (e.g., a table of data from a spreadsheet application), a data transformation may include sorting, filtering, or converting the data into a normalized form.

According to aspects, the client 110 signals the data visualization platform 120 to have the geometry laid out for a given type of visualization when the client 110 renders, hit tests, or performs other functions for which it needs to know the layout. According to aspects, the data visualization platform 120 positions objects within the visualization and creates their geometries. In various aspects, a series layout module 140 comprises series layouts that draw geometry for each series of data within a plot area in a specific format (e.g., columns for column series, markers for scatter series, bubbles for bubble series, etc.). According to aspects, the series layout module 140 is operable to produce annotated geometry from a limited and immutable view of the data and surface description. That is, the series layout module 140 takes a set of data plus a surface description (e.g., visualization type, visualization size, client resolution/dpi, coordinate space, etc.) as inputs, and produces a collection of annotated geometry as output. In some aspects, the outputted geometry is cached in a series object, and the series layout module 140 is not invoked again unless layout is required. In various aspects, the core engine 130 is operable process the annotated geometry and to deliver shared functionalities (e.g., titles, axes, legends, colors, etc.) of the series and data points without assistance from the series layout module 140.

According to aspects, the annotated geometry is cached so that it can be iterated for animation or other interactivities without having to repeat layout. In various aspects, the cached information comprises a tree of element objects, where the root object is the visualization (e.g., chart, infographic, map, gauge, etc.), and child elements include shared objects such as a legend, a plot area, chart elements (e.g., for data, series, or legend entries, a chart title, axis titles, etc.). The client 110 is operable in various aspects to request drawing instructions from the data visualization platform 120 by asking questions, for example, what is the geometry of the visualization, where is it located, what is the text, etc.

As described above, the system 100 uses series layouts (e.g., PieSeriesLayout, ScatterSeriesLayout, ColumnSeriesLayout, etc.) rather than chart layouts when creating a visualization. A series layout, lays out a series of data within the coordinate space of a visualization to create the geometry that represents the data in a series-by-series format. For example, a PieSeriesLayout is operable to output individual wedges representing an individual data series (i.e., the series-by-series format), whereas a PieChartLayout would only be operable to output an entire chart (i.e., all of the data series). According to an aspect, because the data visualization platform 120 creates geometry for each data series individually, the layout engine 150 is operable respond to a change in a data series by invoking the series layout module 140 to only produce geometry for the changed data series; modular updates to the visualization are thus enabled. Similarly, in aspects in which the core engine 130 has centralized the shared functionalities, the shared objects are operable to be modularly updated when a change effects a shared functionality.

According to an aspect, once the geometry has been created by the series layout module 140, the layout engine 150 is operable to plot an initial visualization. In various aspects, the assembler module 156 of the layout engine 150 assembles geometries generated by the series layout module 140 and sets positions of objects, which represent data points within a visualization, as well as shared objects (e.g., axes, labels, legends, etc.), which may be cached internally within the visualization. According to aspects, the layout engine 150 then sends the plotted objects to the client 110 via a limited set of primitives (e.g., lines, Beziers, etc.) which can be passed directly to an appropriate rendering API or to an additional module or engine for further processing. From these primitives, any geometry can be approximated. Each object in the visualization can be given its own layer as necessary or be represented within a flattened object along with several other objects in its hierarchy.

After an initial visualization is provided by the data visualization platform 120, aspects of the layout engine 150 further enables the modular update the visualization via a change notification. Change notifications are used in aspects to determine how to modify the visualization while preserving as much of the initial (or previous) visualization as possible. For example, when a data point plotted in a map data visualization has its latitude and longitude changed, the data visualization is updated to reflect the change without having to re-plot the entire data visualization; just the affected portions. As can be appreciated, without the intelligence of change notifications, when a change is made to the hierarchical data received from the client 110, a system would behave as though the data were reset, and re-plot the entire data visualization (e.g., all data series and shared objects are built as though it were the first plotting), causing inefficiency and the potential loss of special formatting properties and effects. As can also be appreciated, the change notification enables property cascading to be preserved in the event of a hierarchy change. Aspects of the layout engine 150, therefore reduce the system resources needed to process a change affecting the hierarchical data defining the elements in a visualization.

According to an aspect, layout engine 150 includes a transformer module 152 operable to perform hierarchy data transforms to change the format of hierarchical data received according to an arbitrary format to a normalized hierarchy data format. In other aspects, the transformer module 152 is part of the client 110, a standalone module, or part of another portion of the data visualization platform 120. In various aspects, because different clients 110 may transmit hierarchical data according to various formats, the transformer module 152 is operable to interpret the data according to several different hierarchy data formats and heuristically determine which format the data is organized according to. In one aspect, when heuristically determining the hierarchy data format, the transformer module 152 "walks through" (e.g., processes line-by-line) the data received from the client 110 to process and determine the indices of data points and thereby determine which hierarchy data format is being used.

As is understood, different data hierarchy formats use different indexing schemes when referring to data points, such that different indexing schemes may use more or fewer indices, or may organize indices differently (e.g., a first data hierarchy format uses the indexing scheme: [index, value] and a second uses the indexing scheme: [value, index]). Various aspects of the transformer module 152 are operable to process the data using several different likely indices to heuristically determine the hierarchy data format used by the client 110. In some aspects, likely indices are chosen based on known data hierarchy formats (e.g., list format, parent/child indexed format, etc.), data types (e.g., Integer, Double, NaN, etc.), patterns (e.g., unique values indicate a key index, breaks in sequence/repetition indicate a change in hierarchy level, etc.), the number of elements (e.g., whether data is transmitted in array having 3, 4, 5, etc., elements), or combinations thereof.

The transformer module 152 is operable in various aspects to distinguish between known hierarchy formats by processing (e.g., by "walking through") the data to look for identifying features. For example, one known format may use empty or NaN values to indicate that a data point is a root node, whereas a second format uses fully populated values (i.e., no blanks or NaNs), and therefore the presence blank or NaN values can be used as an identifying feature to eliminate the second format as an option when determining the hierarchy data format based on known formats.

In one aspect, the transformer module 152 checks the received data against each known hierarchy data format before using other methods. In other aspects, the transformer module 152 checks the received data against each known hierarchy data format and eliminates all but one known hierarchy data format, which is then determined to be the hierarchy data format and any discrepancies between the received data and the determined hierarchy data format will be interpreted as malformed data, which the transformer module 152 is operable to correct by promoting any node of unknown hierarchy to root and omitting any leaf node with an unknown or blank value.

Once the hierarchy data format is determined, the transformer module 152 is operable to perform an appropriate hierarchy data transform so that the hierarchy data is re-organized according to the normalized hierarchy data format A pass through hierarchy data transform is used when data is received according to the normalized data hierarchy (i.e., the format does not need to be transformed). According to aspects, data may be received as an entire dataset or as a portion of a dataset (e.g., only the data indicating a most recent change), which the transformer module 152 is operable to ensure is in the normalized hierarchy data format. The transformer module 152 is operable to remap both explicit and inferred hierarchy data from the received format to the normalized hierarchy data format.

According to aspects, the interpreter module 154 is operable to receive data, organized according to the normalized data hierarchy format, to create a change notification, which includes information indicating which nodes of the data (e.g., data series, data points, etc.) are affected by the change and how those nodes are affected. In one aspect, the interpreter module 154 is operable to compare the received data against cached data to create the change notification. According to other aspects, the interpreter module 154 is operable to determine when a change to one node will affect the geometry representing another node in the visualization, such as, for example, when in a three-dimensional chart increasing the value of one data series results in all or part of a different data series being obscured in the visualization.

According to aspects, a change notification may indicate a change in value or property for a data series or a data point within a data series (e.g., blue to red, 1 to 42, TRUE to FALSE, "Good" to "Needs Improvement," etc.), a change in hierarchy (e.g., rearranging the order of child nodes, the promotion of a child node to parent, changing the parent of a child node, removing a leaf node, etc.), or a combination thereof. Multiple nodes may be affected by a single change (e.g., when a root node is deleted, all leaf nodes at the next lower hierarchy may be promoted to root status) and one node may be affected by multiple changes. In various aspects, the interpreter module 154 sends change notifications corresponding to each change in the data, and in other aspects the interpreter module 154 sends a composite notification corresponding to the end result of several changes in the data. For example, swapping the order of two data points in the received data can result in a change in the parentage of a large number of subsequent data points, which can be conveyed in a composite notification that represents all of the changes in parentage within a single notification.

According to aspects, once the changes to the data are determined, the interpreter module 154 sends the affected nodes to the series layout module to generate replacement geometry for the visualization. Replacement geometry updates the cached data used by the layout engine and the display of the visualization by the client. For example, if after receiving data from the client 110 to create a column chart with five columns, the client 110 were to send updated data with different values for one data series (e.g., to increase the height of one column), the interpreter module 154 would compare the new data to the original to determine what changes were made to the data and send the affected data to the series layout module 140. The series layout module 140 would create an updated geometry for the one column representing the data series in the visualization, which would be returned to the layout engine 150 to replace the previous column representing the data series in the visualization; the other four columns do not need to be re-created in this example.

Although a visualization does not render itself, in some aspects the visualization includes formatting properties and effects (e.g., colors, lines, patterns, etc.) via an optional properties associated with the object. According to aspects, these optional properties are a collection of predefined properties that the client 110 can set when defining a visualization and then later retrieve during rendering. Custom properties may also be defined that hold a reference to an existing client-specific format object (e.g., an Office® Art shape property). According to aspects, the predefined properties are strongly typed so they can travel with the visualization if shared with another application. For example, passing a chart from Excel® to PowerView™ applications would maintain the same color scheme when predefined properties exist for fill color, line color, etc. As will be apparent, properties may be set at a high level in the hierarchy data, such as at a root node, and cascade down to lower child nodes. As will also be apparent, a change to the hierarchical structure, such as deleting a parent node, may affect how properties are cascaded.

Figure 2:
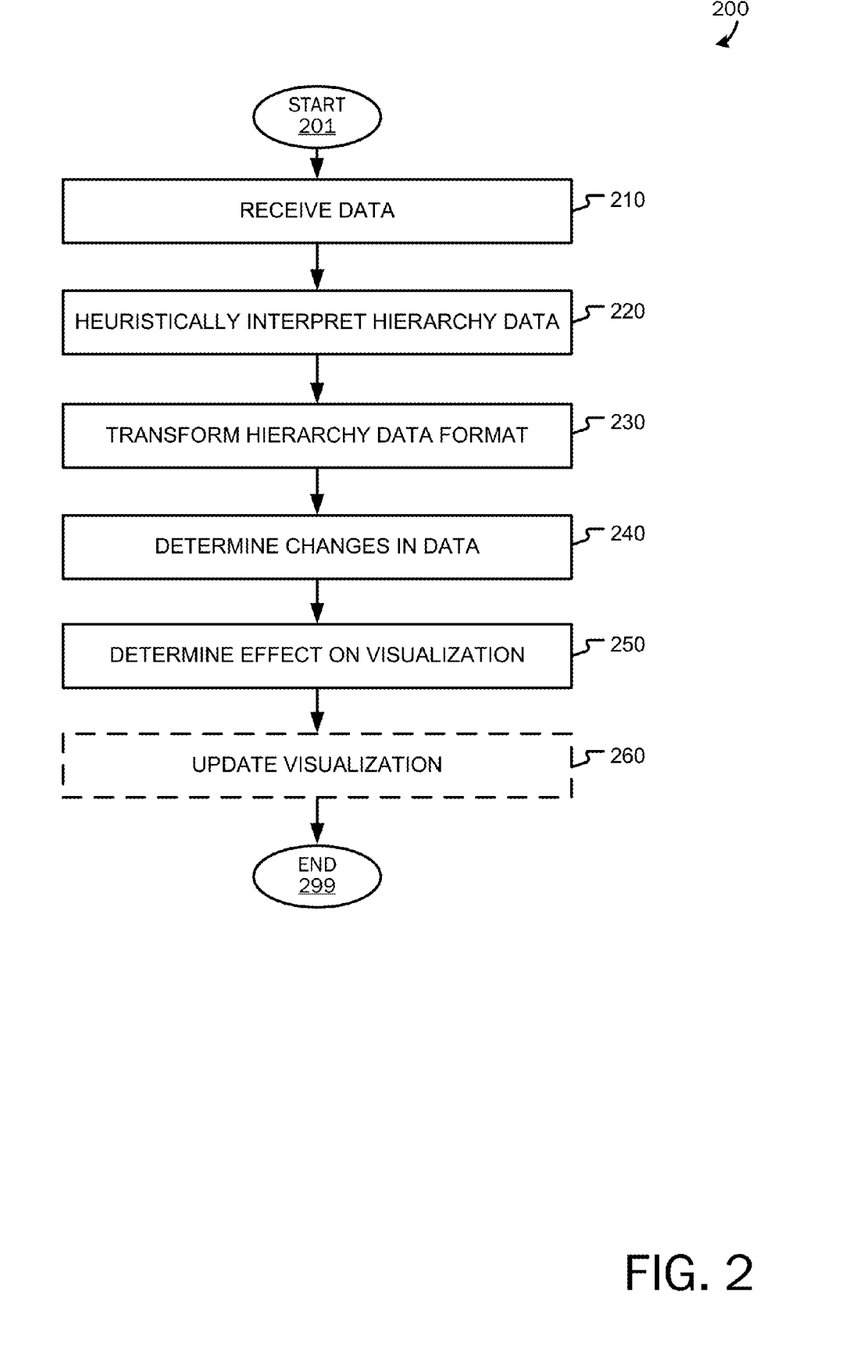
FIG. 2 is an example flow chart of a method for modularly updating a visualization.

FIG. 2 is an example flow chart of a method 200 for modularly updating a visualization. Method 200 begins at START 201 and proceeds to OPERATION 210 where hierarchical data is received. The received data is heuristically interpreted in OPERATION 220 to determine the hierarchy data format of the data. Method 200 then proceeds to OPERATION 230, where the received data is transformed from the determined hierarchy format to a normalized hierarchy format. As will be understood, the particular hierarchy data transform used will correspond to the determined hierarchy data format. As will also be understood, in some aspects the determined hierarchy format may not always be the actual hierarchy format; the data is treated as though it has the determined hierarchy format and may have "malformed" (e.g., having uncertain or blank values) data points when the determined hierarchy format does not match the actual hierarchy format. In some aspects, malformed data points are promoted within the hierarchy data to be root nodes if their parentage is malformed or omitted from the hierarchy data if their values are malformed.

Once the data has been transformed into a normalized hierarchy data format, method 200 proceeds to OPERA- TION 240, where changes in the data are determined. According to aspects, to determine what changes have been made, the received data is compared against a cached version of the data, and any differences between the two versions are noted. In various aspects, after the changes have been determined, the received data replaces the cached data to be used in the next change determination. As will be understood, when data is first received, or when every data point is affected by a change, OPERATION 240 is operable to determine that "everything has changed," which acts as a reset to the cached data.

Method 200 proceeds to OPERATION 250, where it is determined whether any effect is had on the visualization, such that the display of the visualization is altered. For example, changing a value of data represented as a column in a bar graph will alter the height of the column when the resolution of the visualization is sufficient to graphically represent the change in value of the data. Continuing the example, when the column is represented in the visualization such that every pixel in column-height represents a value of 10 for the data (e.g., a 1 pixel high column represents a value of 10, whereas a 2 pixel high column represents a value of 20), and change to the data is such that the initial data value and the final data value can be represented by the same height of column, the visualization will not be altered. For example, in the scenario above, an initial value of 14 and a final value of 6 are rounded to the nearest display interval (i.e., 10, via a 1 pixel high column) and do not alter the visualization, whereas an initial value of 14 and a final value of 15 are rounded to different display intervals and do alter the visualization. One skilled in the art will understand that various rounding schemes (e.g., round nearest, round up, round down, truncate, etc.) may be applied when representing data in visualizations.

In another example, changing the value of the sole data point a data series represented as a pie chart would have no effect on the visualization regardless of its resolution; the sole data point still represents 100% of the pie chart regardless of its value or the change thereto, and the visualization is therefore not altered.

Because a change may be made at one node that affects a different node (e.g., a color property is applied to a node that affects sister nodes, a parent node is deleted, etc.), it is noted in aspects of OPERATIONS 240 and 250 whether the changes to a node should be cascaded, and whether any exceptions to cascading exist (e.g., a particular child node is not to be cascaded to). Options to cascade changes and how to preserve previously cascaded changes can be enabled, disabled, or modified via a client 110 to match user preferences. Changes may be cascaded from parent nodes to child nodes (referred to as inheriting) and between sister nodes (referred to as sharing). For example, when the color of a line representing a data series a line graph is changed, the color change is inherited by all the data points comprising the line. In another example, when multiple data series are plotted on top of one another in a stacked bar graph, a change to one data series may affect the position of a sister node (i.e., the other data series) in the visualization such that the change in value (i.e., height) for the first data series is shared as a change in position for the second data series so that the second data series still appears stacked on the first data series.

When a change has been determined to alter the visualization, method 200 proceeds to optional OPERATION 260, where the affected portions of the data are used to updated the visualization. According to aspects, when updating the visualization, the changes are applied to the cached data to be used for the next change determination and a change notification is built. As will be understood, when data is first received, or when every data point is affected by a change, OPERATION 240 determines in aspects that "everything has changed," which acts as a reset to the cached data, and all previous data points will be replaced with new or updated data points in the updated hierarchy data in OPERATION 250.

At optional OPERATION 260 the change notification is sent to the appropriate actor, (e.g., engine, module, or portion of a data visualization platform) to modularly update the visualization. In some aspects, the change notification is sent to a core engine 130, operable to execute shared functionalities for producing a visualization (e.g., applying a visual theme, applying colorization to a data series, the creation of axes, titling, labeling, etc.). In other aspects, the change notification is sent to a series layout module 140, operable to produce geometry via a series layout to graphically represent a data series within the visualization (e.g., a column in a column chart, a wedge in a pie chart, a point in a scatter plot, etc.). In aspects, the portion of the hierarchical data defining the graphical representation of data within the visualization that is affected by the change is replaced with the updated data (e.g., new color, theme, geometry, etc.) and passed to an appropriate renderer to update the display of the visualization. Method 200 concludes at END 299.

Figure 3:
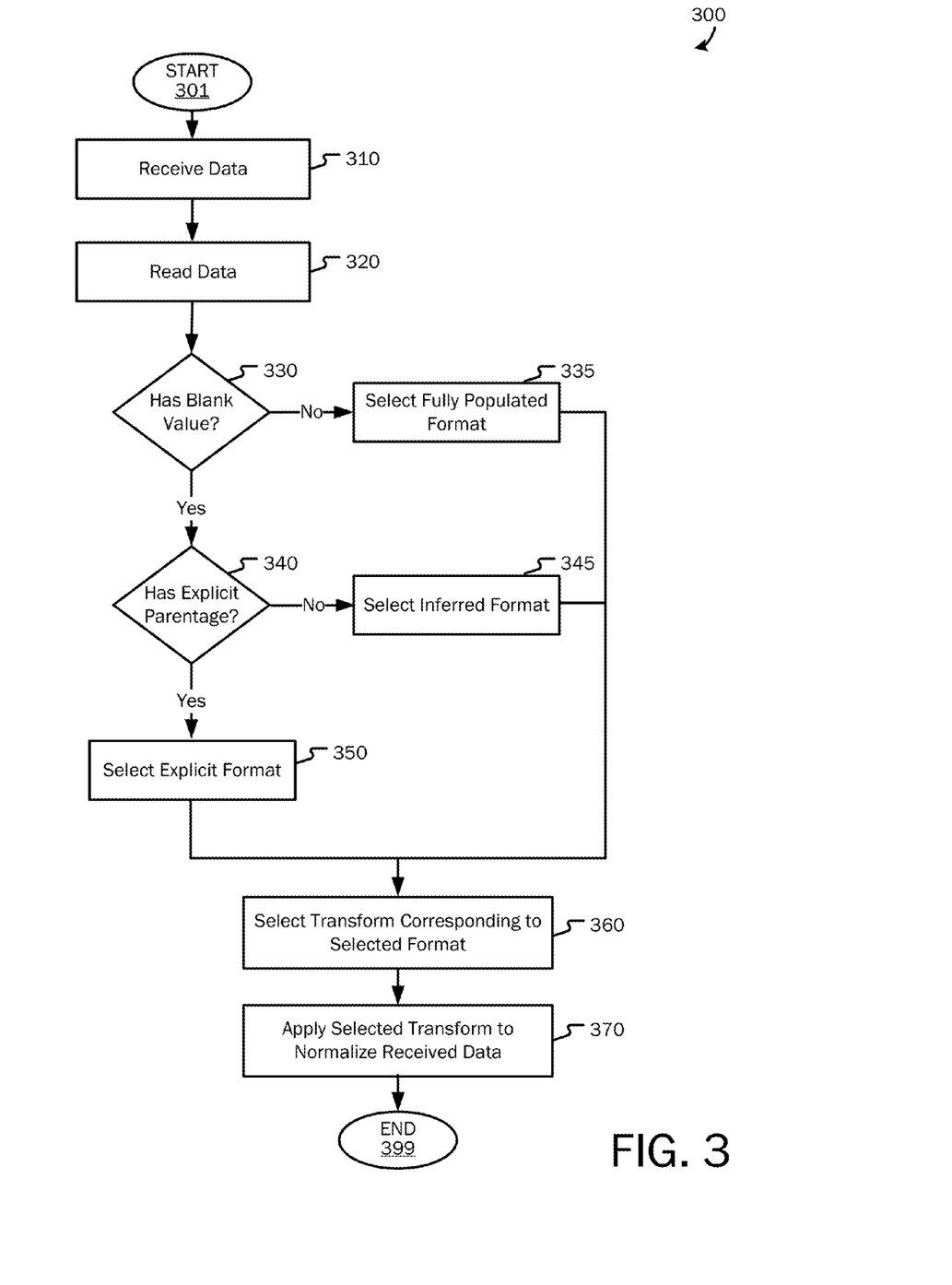
FIG. 3 is an example flow chart of a method for heuristically interpreting data organized according to an arbitrary hierarchy data format.

FIG. 3 is an example flow chart of a method 300 for heuristically interpreting data organized according to an arbitrary hierarchy data format. Method 300 begins at START 301 and proceeds to OPERATION 310, where data is received. According to aspects, the received data is organized according to an arbitrary hierarchy data format (i.e., organized according any one of several formats that are not initially known) and is read at OPERATION 320 to determine what the hierarchy data format is. The hierarchy data format may include zero or more category dimensions and a value dimension, which are used to determine the hierarchy data format.

In one aspect, method 300 proceeds to DECISION OPERATION 330 to determine whether the received data includes any blank values in the hierarchical data. According to aspects, blank values include elements in an array of received data that are formatted as empty, NaN, ERROR, undefined, etc. As will be understood, several data hierarchy formats use blank values when formatting their data. For example, one known format may use empty or NaN values to indicate that a data point is a root node, whereas a second format uses fully populated values to precisely indicate the node's level in the hierarchy. When no blank values are detected, those data hierarchies that use blank values are eliminated as the data hierarchy format of the received data, and method 300 proceeds to OPERATION 335, where an fully-populated data hierarchy format is selected as the data hierarchy of the received data. When blank values are detected, method 300 proceeds to DECISION OPERATION 340 where further refinement is made to determine the data hierarchy format of the received data.

At DECISION OPERATION 340, method 300 determines whether the received data has explicit parentage. As will be understood, several data hierarchy formats use explicit parentage values for formatting their data, whereas other data hierarchy formats use an inferred parentage in formatting their data. As an example of an explicit format, each node is given a first value for use as key number to identify that node and a second value to indicate the key number of its parent. Various explicit formats do not give a second value to root nodes or give root nodes blank values.

As an example of an inferred format, an element in an array of received data states the node's level in the hierarchy (e.g., 1, 2, 3, etc.) but the parentage of that node is determined by the parentage of other nodes, such that, for example, a two nodes in a list of nodes will share the first node's parentage if they share a level in the hierarchy level, otherwise the first node will be inferred to be the parent of the second node is of a lower level or will be inferred to be unrelated if the second node is of a higher level. When distinct categories are not detected, method 300 proceeds to OPERATION 345, where an inferred format of data hierarchy format is selected as the data hierarchy of the received data. When distinct categories are detected, method 300 proceeds to OPERATION 350, where an explicitly formatted data hierarchy format is selected as the data hierarchy of the received data.

As will be understood, the order in which method 300 executes DECISION OPERATIONS 330 and 340 can be reversed to optimize how a hierarchy format is selected. In various aspects, additional determinations are made to further refine a type of hierarchy format.

After selecting a data hierarchy format in OPERATION 335, 345, or 350, method 300 proceeds to OPERATION 360, where a hierarchy data transform corresponding to the selected data hierarchy format is used to transform the hierarchy of the received data into a normalized data hierarchy format. According to aspects, when it is determined that the data was received already according to the normalized format, a pass-through transform is selected, which does not affect the data hierarchy format of the received data. Method 300 then proceeds to OPERATION 370, where the selected transform is applied to the received data to convert the data hierarchy format to the normalized data hierarchy format. Method 300 concludes at END 399.

While the disclosure has been described in the general context of program modules that execute in conjunction with an application program that runs on an operating system on a computer, those skilled in the art will recognize that the disclosure may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
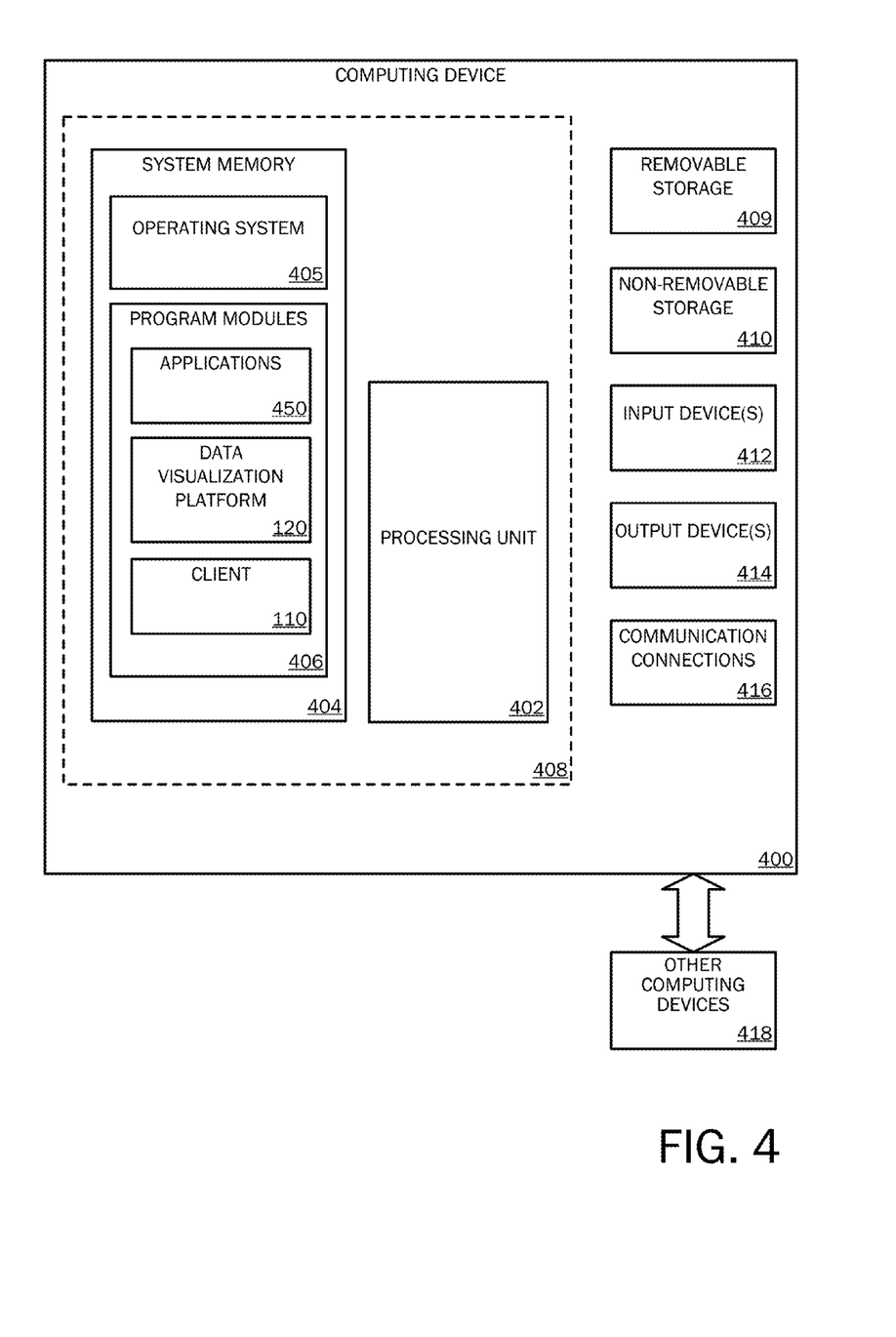
FIG. 4 is an example block diagram of example physical components of a computing.

In some situations, generating visualizations can be very performance intensive for a computer 400. For example, generating charts and maps may require a great deal of computational power or memory, especially when the object comprises a large number of data points. According to another aspect of the present disclosure, data visualization platform performance optimizations are provided. Data visualization platform performance optimizations provide improved performance in the generation of visualizations such as charts, infographics, maps, gauges, etc.

Figure 5A:
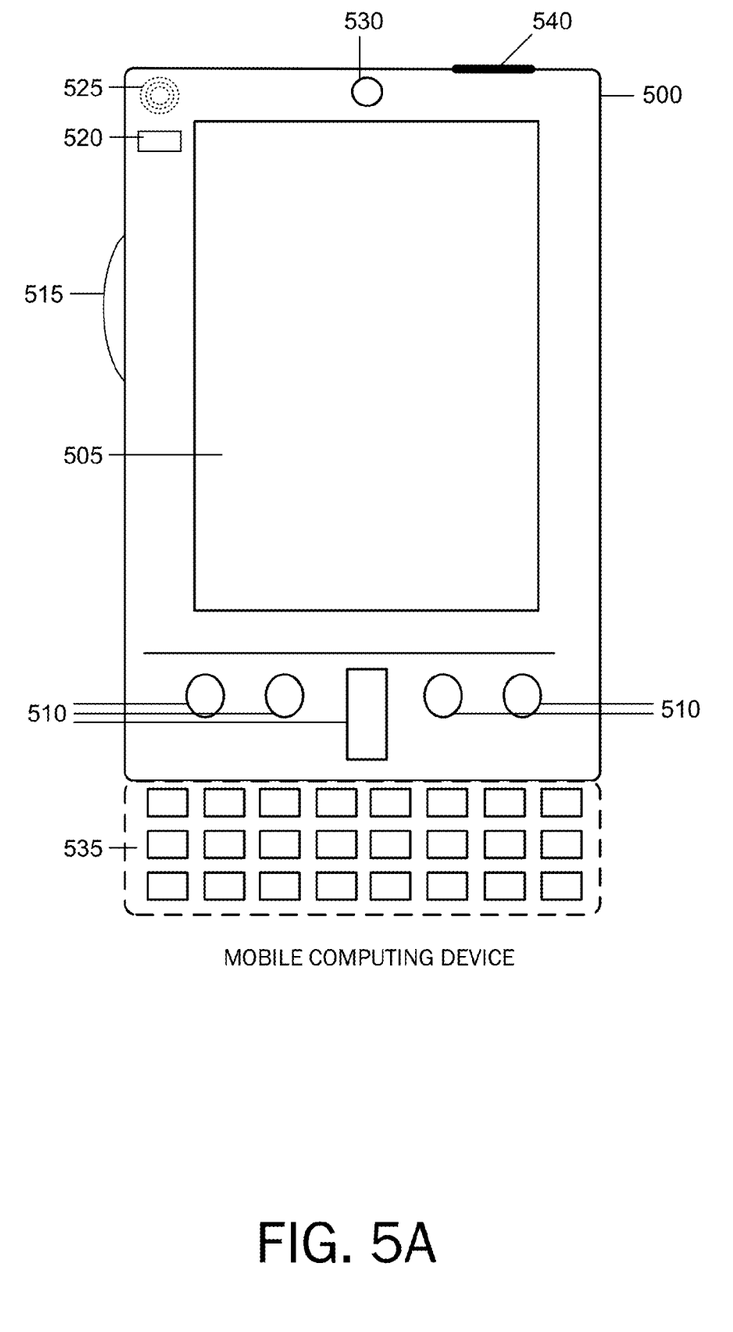
FIGS. 5A and 5B are example block diagrams of a mobile computing device.
Figure 5B:
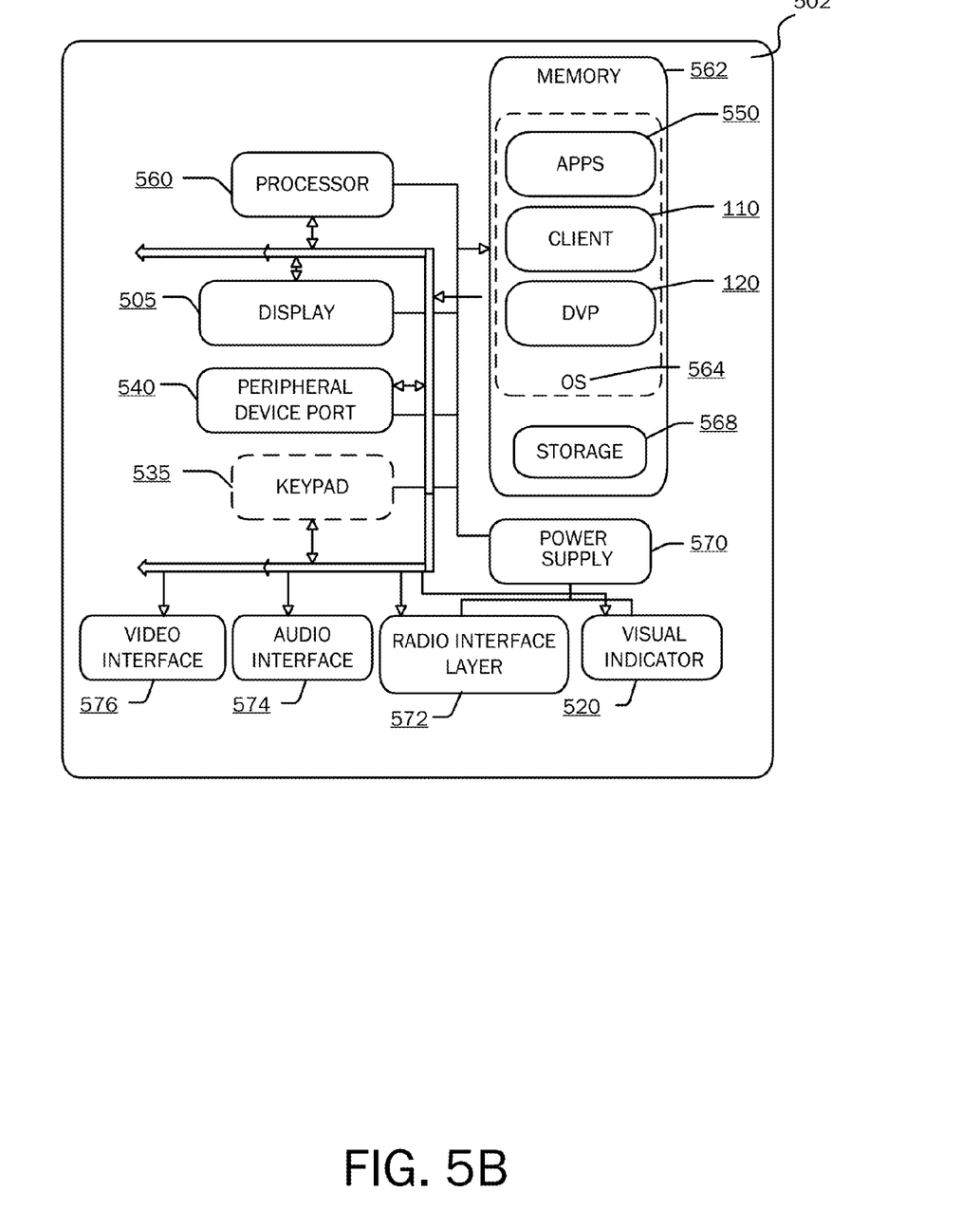
Figure 6:
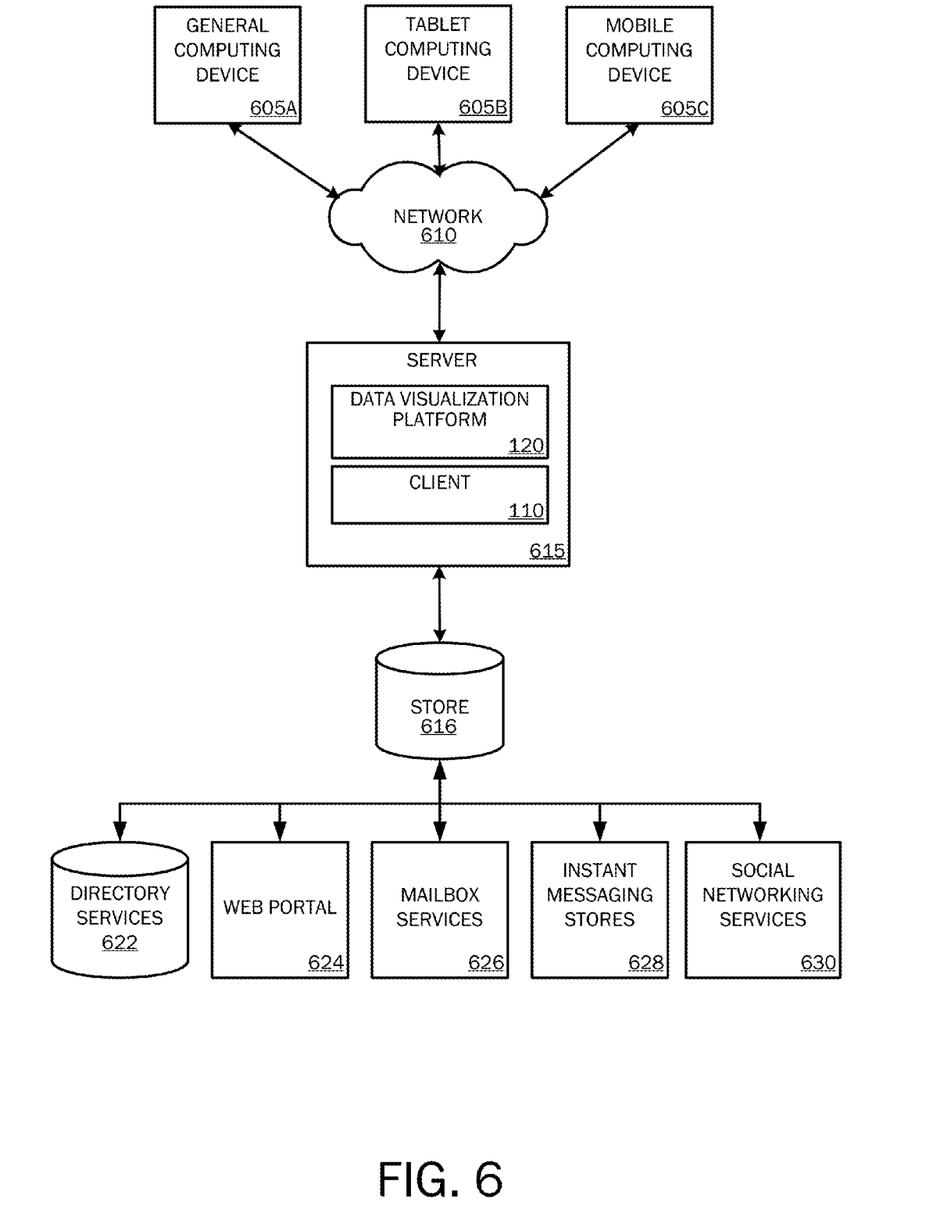
FIG. 6 is an example block diagram of a distributed computing system.

FIGS. 4-6 and the associated descriptions provide a discussion of a variety of operating environments in which examples of the disclosure may be practiced. However, the devices and systems illustrated and discussed with respect to FIGS. 4-6 are for purposes of example and illustration and are not limiting of a vast number of computing device configurations that may be used for practicing aspects of the disclosure, described herein.

FIG. 4 is a block diagram illustrating physical components (i.e., hardware) of a computing device 400 with which examples of the present disclosure may be practiced. The computing device components described below may be suitable for the client device described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more programming modules 406 suitable for running software applications 450, such as client application 110. According to an aspect, the system memory 404 may include the data visualization platform 120. The operating system 405, for example, may be suitable for controlling the operation of the computing device 400. Furthermore, aspects of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., client application 110, data visualization platform 120) may perform processes including, but not limited to, one or more of the stages of the methods 200 and 300, illustrated in FIGS. 2 and 3. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, or transceiver circuitry; universal serial bus (USB), parallel, or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects of the disclosure may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative examples, mobile computing device 500 may incorporate more or less input elements. For example, the display 505 may not be a touch screen in some examples. In alternative examples, the mobile computing device 500 is a portable phone system, such as a cellular phone. The mobile computing device 500 may also include an optional keypad 535. Optional keypad 535 may be a physical keypad or a "soft" keypad generated on the touch screen display. In various aspects, the output elements include the display 505 for showing a graphical user interface (GUI), a visual indicator 520 (e.g., a light emitting diode), or an audio transducer 525 (e.g., a speaker). In some examples, the mobile computing device 500 incorporates a vibration transducer for providing the user with tactile feedback. In yet another example, the mobile computing device 500 incorporates a peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 can incorporate a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

One or more application programs 550, for example, client application 110, may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the data visualization platform 120 may be loaded into memory 562. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications or an audio interface 574 may be used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one example of the architecture of a system for providing data visualization as described above. Content developed, interacted with, or edited in association with the client application 110 or data visualization platform 120 may be stored in different communication channels or other storage types. For example, various documents may be stored using a directory service 622, a web portal 624, a mailbox service 626, an instant messaging store 628, or a social networking site 630. The client application 110 or data visualization platform 120 may use any of these types of systems or the like for providing data visualization, as described herein. A server 615 may provide the client application 110 or data visualization platform 120 to clients 605A-C. As one example, the server 615 may be a web server providing the client application 110 or data visualization platform 120 over the web. The server 615 may provide the client application 110 or data visualization platform 120 over the web to clients 605 through a network 610. By way of example, the client computing device may be implemented and embodied in a personal computer 605A, a tablet computing device 605B or a mobile computing device 605C (e.g., a smart phone), or other computing device. Any of these examples of the client computing device may obtain content from the store 616.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the disclosure as claimed in any way. The aspects, examples, and details provided in this application are considered sufficient to convey possession and enable others to make and use the best mode of present disclosure. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method to modularly update a visualization defined by hierarchical data in response to a change to the hierarchical data, comprising:
  receiving, from a client device, hierarchical data;
  selecting a hierarchy format associated with the hierarchical data;
  based on the selected hierarchy format, determining if the hierarchical data includes malformed data, the malformed data comprising one or more data points each having an uncertain or a blank value;
  when the hierarchical data includes the malformed data, omitting the malformed data from the hierarchical data;

plotting one or more objects in the visualization based on the hierarchical data;

receiving, from the client device, a change to the hierarchical data;

determining a portion of the visualization affected by the change to the hierarchical data;

generating an updated portion of the visualization for the affected portion based on the change to the hierarchical data; and providing, to the client device, at least the updated portion of the visualization.

2. The method of claim 1, further comprising:

in response to receiving the hierarchical data, caching the hierarchical data; and in response to receiving the change to the hierarchical data, updating the cached hierarchical data with the change.

3. The method of claim 2, wherein the change to the hierarchical data is received as updated hierarchical data and the change to the hierarchical data is determined by comparing the updated hierarchical data to the cached hierarchical data.

4. The method of claim 1, wherein the hierarchical data is received according to an arbitrary hierarchy format, and selecting the hierarchy format comprises:

heuristically selecting the hierarchy format to be associated with the hierarchical data; and prior to omitting the malformed data, transforming the selected hierarchy format into a normalized hierarchy format.

5. The method of claim 4, wherein heuristically selecting the hierarchy format of the hierarchical data comprises:

reading the hierarchical data to determine whether the hierarchical data includes the blank or the uncertain values; and reading the hierarchical data to determine whether the hierarchical data includes explicit parentage, wherein the hierarchy format is selected based the readings of the hierarchical data.

6. The method of claim 4, wherein:

omitting the malformed data from the hierarchical data comprises omitting a node associated with each of the one or more data points having the uncertain or the blank value from the hierarchical data;

the malformed data further comprises one or more data points with malformed parentage; and the method further comprises promoting a node associated with each of the one or more data points with malformed parentage to a root node within the hierarchical data.

7. The method of claim 1, wherein the change to the hierarchical data comprises a new portion of hierarchical data, and updating the visualization comprises adding the new portion of hierarchical data to the visualization.

8. The method of claim 1, wherein the change to the hierarchical data comprises a deletion of a portion of the hierarchical data from the visualization, and updating the visualization comprises removing the portion of the hierarchical data from the visualization.

9. The method of claim 5, further comprising in response to a determination that the hierarchical data does not include blank or uncertain values, selecting a fully-populated hierarchy format as the selected hierarchy format.

10. The method of claim 5, further comprising in response to a determination that the hierarchical data does not include explicit parentage, selecting an inferred hierarchy format as the selected hierarchy format.

11. A system to modularly update hierarchical data of a visualization, comprising:

a processor;

a storage device storing instructions, which when executed by the processor, cause the processor to perform a method comprising:

selecting a hierarchy format associated with the hierarchical data;

based on the selected hierarchy format, omitting malformed data from the hierarchical data, wherein the malformed data comprises one or more nodes each having one of:

an uncertain value;

a blank value; or a malformed parentage;

determining one or more changes to the visualization based on a change notification, wherein the change notification indicates one or more changes to the hierarchical data; and based on the change notification, modularly updating the visualization by updating a portion of the visualization affected by the one or more changes to the hierarchical data.

12. The system of claim 11, wherein the method further comprises:

determining one or more shared functionalities for at least a portion of the hierarchical data; and creating one or more shared objects within the visualization using the determined one or more shared functionalities.

13. The system of claim 12, wherein the shared functionalities include at least one of:

creating an axis;

creating a title;

creating a legend;

applying a colorization to a geometry representing the hierarchical data;

applying a visual theme;

inserting trend lines; or labeling data points.

14. The system of claim 11, wherein selecting the hierarchy format to be associated with the hierarchical data comprises:

reading the hierarchical data to determine whether the data includes blank values; and reading the hierarchical data to determine whether the data includes explicit parentage, wherein the hierarchy format is selected based on the readings of the hierarchical data.

15. The system of claim 11, wherein determining the one or more changes to the visualization comprises comparing a cached version of the hierarchical data to the one or more changes to the hierarchical data to determine the one or more changes to the visualization.

16. A computing device operable to modularly update a visualization defined by hierarchical data in response to a change to the hierarchical data, comprising:

a processor;

a storage device storing instructions, which when executed by the processor causes the computing device to be operable to:

receive, from a client device, hierarchical data;

cache the hierarchical data as a cached hierarchical data;

based on a selected hierarchy format associated with the hierarchical data, omit malformed data from the hierarchical data, wherein the malformed data comprises one or more data points each having one of:
an uncertain value;
a blank value; or
a malformed parentage;
receive updated hierarchical data, wherein the updated hierarchical data includes a change to the cached hierarchical data;
compare the updated hierarchical data against the cached hierarchical data to determine the change to the hierarchical data;
determine whether a portion of the visualization affected the change is materially altered; and
when the portion of the visualization affected by the change to the hierarchical data is materially altered:
generate an updated portion of the visualization for the affected portion based on the change to the hierarchical data;
provide, to the client device, at least the updated portion, wherein unaffected portions of the visualization not affected by the change are preserved; and
cache the updated hierarchical data as the cached hierarchical data.

17. The computing device of claim 16, wherein the hierarchical data is received according to an arbitrary hierarchy format, and the computing device is further operable to:
heuristically select the hierarchy format associated with the hierarchical data; and
apply a transform corresponding to the heuristically determined hierarchy format to the hierarchical data, wherein the corresponding transform organizes the hierarchical data according to a normalized hierarchy format.

18. The computing device of claim 16, wherein the change to the hierarchical data comprises new hierarchical data for a portion of the hierarchical data.

19. The computing device of claim 16, wherein the change to the hierarchical data affects a shared object of the visualization.

20. The system of claim 11, wherein the method further comprises prior to determining the one or more changes to the visualization, transforming the selected hierarchy format into a normalized format.

* * * * *